Sept. 21, 1937.  H. JENETT  2,093,451
IMPREGNATED MATERIAL
Filed Dec. 22, 1934
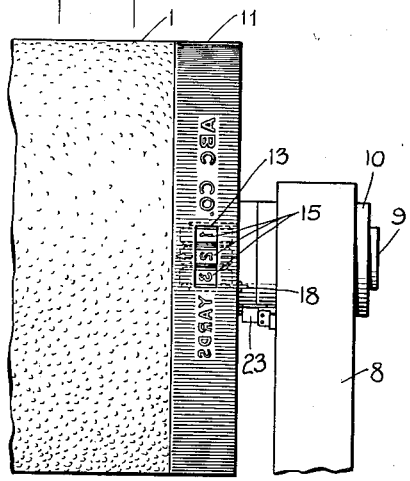
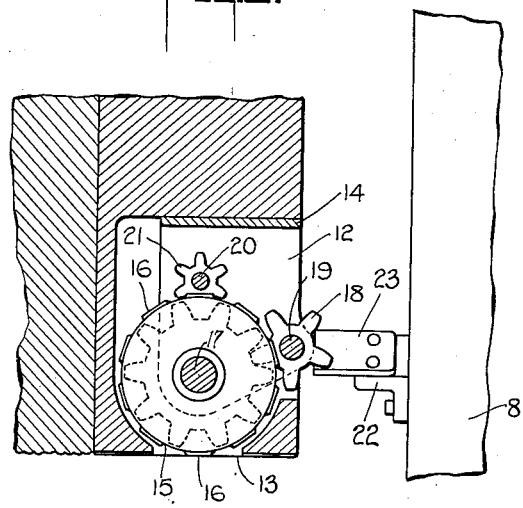
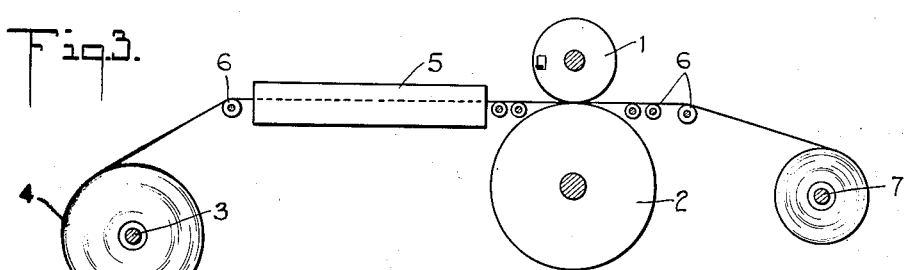
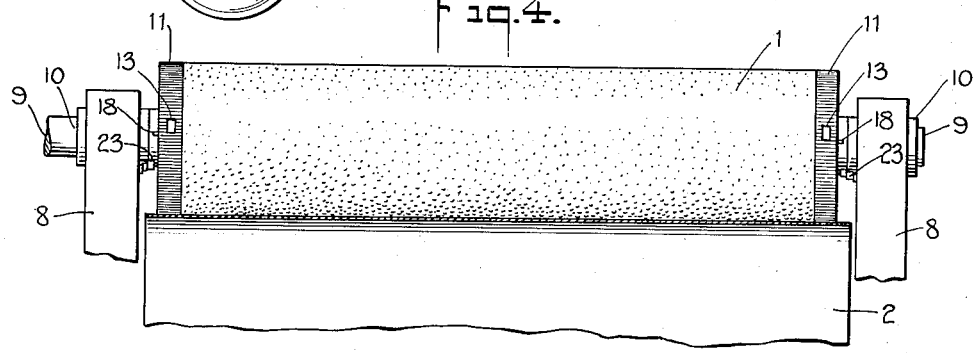
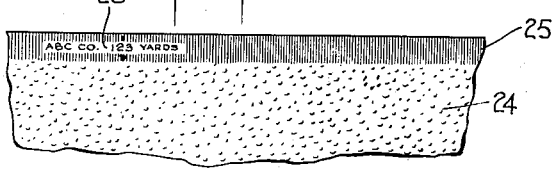
INVENTOR
Henry Jenett
BY
ATTORNEYS Patented Sept. 21, 1937

2,093,451

UNITED STATES PATENT OFFICE 2,093,451

IMPREGNATED MATERIAL

Henry Jenett, Demarest, N. J., assignor to Celanese Corporation of America, a corporation of Delaware Application December 22, 1934, Serial No. 758,726

4 Claims. (Cl. 91—68)

This invention relates to the finishing of impregnated materials, for example, imitation leather and to the device for finishing such material with particular reference to a method and device for forming a false selvedge on such materials.

An object of the invention is to form in an economic and expeditious manner an impregnated material that is evenly coated or impregnated from edge to edge and that may be packaged into rolls etc. without causing the center part to wrinkle. Other objects of the invention will appear from the following detailed description.

In the drawing is shown a device also forming a part of this invention. In the various figures, like reference numerals refer to the same or similar parts.

Fig. 1 shows an enlarged front section of the device.

Fig. 2 shows an enlarged front section partly in cross-section of the device.

Fig. 3 is a diagrammatic side view of a device coming within this invention.

Fig. 4 is a front view showing the embossing roll with the selvedge forming members attached.

Fig. 5 is a plan view of a segment of impregnated material produced according to this invention.

In the manufacture of artificial leather, the grey goods are generally coated by means of spreading machines. The doctor blades or scrapers, which apply the coating material to the fabric, are generally of the full width of the grey goods, so that the coating material or dope covers the base material from selvedge to selvedge. The selvedges are often unevenly coated, frayed, beady, or thinly covered due to the action of the spreading machine and the uneven tension of the fabric, which fabric will absorb more coating material or dope on the warp and fill width than on the closely woven selvedges. When such coated fabrics are embossed by means of heated and engraved rolls or by heating the composite material and engraving with cold rolls, the selvedges cause considerable trouble, as they are taut and permit the fabric to bulge in the center. This causes uneven rolls or packages and some inconvenience in cutting of the goods.

Normally the selvedge of the base fabric, either before or after coating, is not trimmed off in the producer's establishment, because a cut edge would offer fraying difficulties before coating and offer, after coating, an opportunity for peeling of the plastic material from the base.

According to my invention, I coat the base material with any suitable thermoplastic material, emboss a false selvedge into the material inside the original selvedge of the base material and then trim off the original selvedge. The false selvedge may have embossed therein numbers at spaced intervals to mark the yardage of the material.

By employing this invention, imitation leather material may be formed that may be rolled or otherwise packaged that does not bulge in the center of the roll due to thick or uneven selvedges or difference in elasticity between the flexible centers and the stiffer selvedges. Further, the material is produced with even, smooth edges, which require no trimming by the converter who can use the artificial or false selvedge for sewing or pasting-in.

The invention results in an imitation leather material having a non-rip edge which is neither heavier nor of different texture than the rest of the fabric. Further, the artificial selvedge may afford, by embossed letters, a permanent identification on either side of the material, for the protection of both manufacturer and converter. Also the artificial or false selvedge may contain spaced marks for registering the yardage of the material. Thus, the manufacturer is able to permanently imprint yardage marks on the goods, which eliminates claims, gives a check on stock and simplifies stock-taking to a mere matter of reading off the last mark on each roll.

This invention is applicable to any suitable fabric material coated or impregnated with a thermoplastic material, for example, an organic derivative of cellulose such as organic esters of cellulose and the cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose. The base material which may be a fabric, for instance cotton duck, may be coated with any material and in any manner, for instance, the materials and methods referred to in U. S. applications No. 641,233 filed November 4, 1932, No. 671,642 filed May 18, 1933, No. 681,689 filed July 22, 1933, No. 718,168 filed March 30, 1934 and No. 754,501 filed November 23, 1934 may be employed.

As a visual aid in illustrating this invention, reference is made to the drawing wherein a device, forming a part of this invention, is shown and also one mode of carrying out the invention. With particular reference to Fig. 3 there is shown an embossing roll 1 of any suitable metal, alloy or composition having embossed or engraved thereon any suitable design, figure, pattern, etc. which it is desired to impart to the coating of a coated fabric or other material. A matrix roll 2 is provided to register with the embossing roll 1 and may contain a design on the embossing roll in which case its circumference is preferably a multiple of the circumference of the embossing roll, or it may be a plain roll.

A support 3 may be provided for holding a supply roll 4 of coated fabric to be embossed. In place of the roll 4 the coated fabric may be led directly from the coating device to the embossing rollers or the embossing rollers may be a part of the coating device. If cold embossing rollers are employed, it may be preferable to preheat the plastic composition contained in the composite material to be embossed. This may be accomplished by passing the material through a heating zone 5 that may be a heated chamber, spaced heated platens, a heated drum over which the material passes or other form of heating means.

Suitable supporting rollers 6 may be provided to support the material on either or both sides of the embossing roll. These rollers may or may not be driven as by a chain running over sprockets at their ends. A roll 7, preferably driven, may be provided to pull the material from the embossing rolls and package it in roll form.

A suitable frame 8 may be provided for supporting and journalling the embossing rolls. The engraved roll 1 may be suitably fastened to a shaft 9 resting in bearings 10 of the frame 8. At the ends of the roll 1 are placed discs 11 having their circumferential edge scored or knurled. These discs or short rolls may be integral with the body of the roll 1 or they may be separate rolls held in place by being bolted to the roll 1 or by a collar on the shaft 9. Separable end rolls are preferred as the same end rolls may then be employed with any one of a plurality of main rolls. A different main roll 1 is required for each design to be imparted to composite material.

The end rolls 11 may contain a pocket 12 formed in the side thereof which pocket also has an opening 13 on the circumference of the roll. A housing member 14 may be provided adapted to fit in and be secured to the inside of the pocket 12. The housing member 14 may contain any suitable counting device, for instance, a plurality of number wheels 15 having raised or sunken numerals 16 thereon. These wheels may be mounted on a shaft 17 suitably journaled in the housing 14. A driving member 18 may be suitably mounted on a shaft 19 journaled in the housing 14. An auxiliary shaft 20 having mounted thereon gear wheels 21 may also be journaled in the housing 14. The arrangement of parts being such that for each movement of the gear 18 one wheel 15 moves the distance of the raised figures 16. The second wheel moves the distance of the raised figures for each 10 movements of the first wheel in a manner to register the number of rotations of the roll 11—1—11. On the main frame 8 is secured a bracket 22 carrying a wear plate 23 preferably adjustable with respect to the bracket. The wear plate is positioned so that as the roll 11—1—11 rotates it contacts the gear 18 and moves said gear wheel through a sufficient distance to change the counter by one number. The diameter of the roll 1 is preferably such that its circumference is a whole number division or multiple of a yard or other unit of measure. A plurality of counter-mechanisms 14 may be provided on each wheel if desired.

In operation a coated fabric, as it comes from the coating device, is passed between the embossing roll 1 and the matrix roll 2 so that the design on the roll 1 is imparted to the body of the material. The width of the roll 1 in relation to the material is preferably such that the outer edges of the rolls 11 fall just inside the selvedge on the fabric of the material. The engravings upon the rolls 11 that preferably contain a milled edge are such that they press the plastic coating material firmly into the fabric base material and also reduce the thickness of the composite material slightly below that of the body of the material. As the fabric is passed between the rolls 1 and 2 the raised numerals, on the counter wheels, that pass through or register with the opening 13, emboss the yardage on the material. The rolls 11 may contain besides the scorings a trade name, etc. By these means a design is embossed into the composite material and a marginal strip of the material is well compressed to form a false selvedge. The material may then pass through a cutting device which trims off the true selvedge and leaves the material bounded by the false selvedge. The false selvedge being formed by a pressing of the thermoplastic material into the fabric seals the fabric against fraying and the whole assembly against any tendency of the plastic to peel off from the fabric. The fabric may then be packaged into a roll without stretching the center portion. If desired, the heavy and/or uneven natural selvedge of the fabric material may be cut from the composite material prior to embossing same.

The resulting product is an imitation leather or other similar article having an embossed design 24 on the body part of same and a selvedge 25 formed of the same type of weave of base material as the body portion but sealed against fraying or separating from the coating material by the embossed selvedge. The selvedge may be of any desired design and may contain a trade name, grade indication and/or yard marks 26, or other marks indicating the amount of material on the roll.

It is to be understood that the foregoing detailed description and drawing are merely given by way of illustration and many alterations may be made therein without departing from the spirit of my invention.

Having described my invention, what I desire to secure by Letters Patent is:

1. A composite material comprising a base material of uniform texture throughout and a coating of an organic derivative of cellulose material, the composite material having a marginal edge sealed against fraying of the base material and peeling of the coating material from the base material.

2. A composite material comprising a base material of uniform texture throughout and a coating of cellulose acetate material, the composite material having a marginal edge sealed against fraying of the base material and peeling of the coating material from the base material.

3. A composite material comprising a fabric base material of uniform texture throughout having a coating of an organic derivative of cellulose material and a marginal edge wherein the organic derivative of cellulose material is pressed into the base material whereby a false selvedge is formed.

4. A composite material comprising a fabric base material of uniform texture throughout having a coating of cellulose acetate and a marginal edge wherein the cellulose acetate material is pressed into the base material whereby a false selvedge is formed.

HENRY JENETT.